Patented Aug. 25, 1942

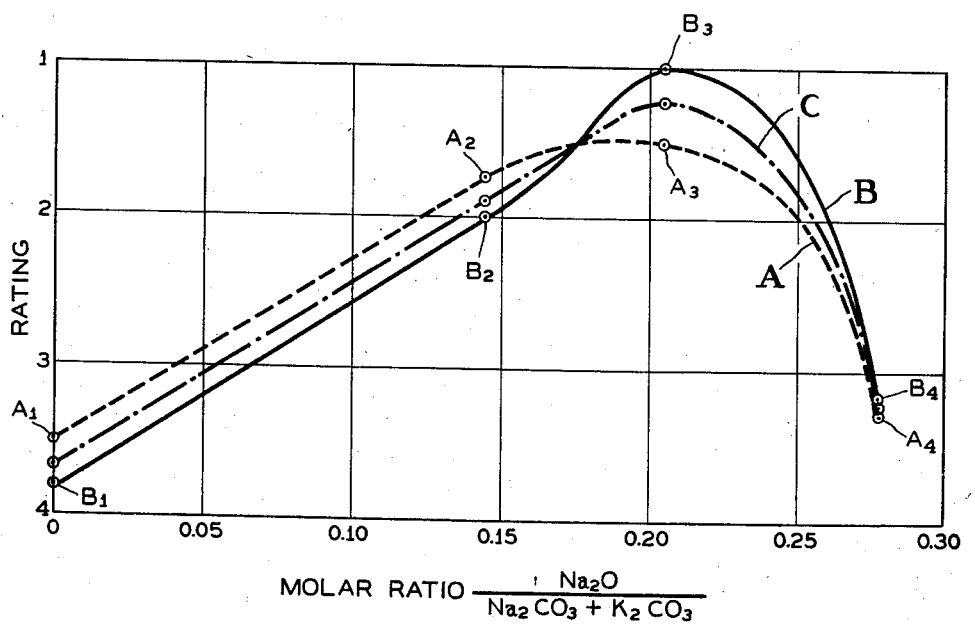

2,294,077

UNITED STATES PATENT OFFICE 2,294,077

MANUFACTURE OF OPTICAL GLASS

Frank J. Dobrovolny, Ransomville, N. Y., assignor to E. I. du Pont de Nemours & Company, Wilmington, Del., a corporation of Delaware Application December 23, 1940, Serial No. 371,218

6 Claims. (Cl. 106—52)

This invention relates to the manufacture of glass, and more particularly to the production of high grade optical glass.

This application is a continuation in part of my co-pending application, Serial Number 120,613, filed January 14, 1937, now Patent No. 2,230,199.

Optical glass ordinarily is soda glass of high quality which is suitable for the manufacture of lenses, prisms, and similar optical devices. Optical glass must be made of ingredients of highest purity, so as to obtain a substantially colorless and highly transparent glass.

The composition of optical glass will vary, depending upon the particular use for which it is desired. For example by varying the composition, the optical properties of the glass such as refractive index, absorption spectra and the like may be varied as desired. However, for many purposes a conventional soda-lime glass often is suitable for optical purposes if it is of high quality. In other cases, ingredients such as magnesia, borax, lead oxide, or the like may be included in the glass batch formula to obtain specific optical properties. In any event, one or more alkali metal carbonates, together with silica, form the basis for the mixture of ingredients to be fused to make the optical glass.

Pieces of optical glass suitable for making prisms, lenses, and the like also must have a high degree of uniformity and be entirely free from gas bubbles, striae, and similar imperfections. In order to obtain such pieces of glass, optical glass is made by fusing silica, soda ash and other suitable glass making ingredients in clay fusion pots. The fusion of the ingredients is carried out with the utmost care to avoid contamination of the melt. After fusing, the glass batch is kept molten for a relatively long period of time and well stirred, so as to eliminate all gas bubbles, and inhomogeneities so far as possible. The glass is then cooled and annealed without removing it from the fusion pot; and finally, on cooling further, the glass cracks and breaks up into fragments, accompanied by destruction of the clay pot. In spite of the most careful operation the resulting pieces of glass will have many imperfections, especially striae formed by incomplete solution or reaction of the ingredients. It is, therefore, necessary to examine each piece or fragment to select those which are free from imperfections. As a result of this operation usually only a relatively small portion of the original glass ingot is selected as suitable for the manufacture of optical devices and usually it is difficult to find many pieces suitable for making large lenses and prisms, for example, lenses 4″ or more in diameter.

An object of the present invention is a novel and improved method for making optical glass. A further object is to make optical glass of improved quality having fewer imperfections in the finished glass. Another object is to provide a method for decreasing formation of striae and similar imperfections in the manufacture of optical glass. Still other objects will be apparent from the following description of my invention.

The above objects are obtained in accordance with the present invention by incorporating in the glass batch a certain limited amount of sodium monoxide, as hereinafter described. In practicing my invention, after the formula for making optical glass has been selected, I revise that formula by substituting for part of the alkali metal carbonate a stoichiometrical equivalent of sodium monoxide ($Na_2O$). I have discovered that if the amount of sodium monoxide used is such that the molar ratio of sodium monoxide to the total alkali metal carbonate in the glass batch is greater than about 0.1:1 but less than 0.3:1, the resulting glass will have fewer imperfections than glass of identical composition which was made without including sodium monoxide in the glass batch. I have further discovered that in order to obtain this result, it is necessary to have the relative proportions of sodium monoxide and alkali metal carbonate within the ratio expressed above. Preferably I maintain the molar ratio of sodium monoxide to total alkali metal carbonate in the glass batch within the range of 0.13:1 to 0.26:1. Within this preferred range, the resulting glass is extraordinarily free from striae, gas bubbles, and similar imperfections.

The appended drawing is a graph showing the results of adding sodium monoxide to the glass batch in making optical glass. Curves A and B in the drawing are drawn through points plotted from actual experiments. Curve C represents the mean of curves A and B. In plotting these curves, glass samples made from the fusion of batches containing varying amounts of sodium monoxide and sodium carbonate (all samples having identical composition as determined by analysis) were examined by a number of observers and rated as to the presence or absence of striae. Those samples which were of the highest quality in this respect were given a rating of 1 and those of poorer quality were given a rating represented by a higher number as is more fully explained in the examples below. These ratings were plotted as ordinates and the molecular ratio of the sodium monoxide and the total alkali metal carbonates from the glass melt were plotted as abscissae.

From this graph it will be noted that while the replacement of the alkali metal carbonate by sodium monoxide in the glass batch progressively increases the quality of the resulting glass up to a certain point, a further increase of the sodium monoxide content of the batch tends to rapidly decrease the quality of the product. I have found that if too much sodium monoxide is used the quality of the resulting glass is no better than if no monoxide at all were used, and in some cases even poorer.

In one method of practicing my invention I may make a finely divided mixture of glass making ingredients including a suitable form of silica such as sand, a calcium compound such as high grade lime or precipitated calcium carbonate, soda ash or other suitable form of sodium carbonate, and a limited amount of sodium monoxide, as described above. Other ingredients may be added to the mixture as desired, for example, an oxidizing agent such as sodium nitrate. In addition to soda ash, another alkali metal carbonate, for example, potassium carbonate may be added. In any event, the molar ratio of sodium monoxide to the total alkali metal carbonate in the mixture will lie within the range of 0.1:1–0.3:1, and preferably between 0.13:1 and 0.26:1. Obviously, the relative amounts of alkali metal carbonate, sodium monoxide, and other alkali metal compounds such as sodium nitrate, borax or the like are added in such amounts as to obtain the desired content of alkali metal oxide as determined by analysis of the finished glass. Such a mixture, in accordance with my invention, is fused to form molten glass and then is refined, cooled, and annealed and subsequently treated in the conventional manner.

EXAMPLE

A series of 8 mixtures of glass making ingredients were made up so as to contain sand, calcium carbonate, sodium carbonate, potassium carbonate and, with the exception of two mixtures, sodium monoxide. The amounts of the various sodium and potassium compounds and other ingredients in these eight mixtures were proportioned so as to produce on fusion glasses having substantially identical compositions. The composition of the eight mixtures is shown in the following table:

*Table I*

(The figures opposite the ingredients indicate parts by weight.)

| Ingredients | Mixtures | | | |
|---|---|---|---|---|
| | $A_1$ and $B_1$ | $A_2$ and $B_2$ | $A_3$ and $B_3$ | $A_4$ and $B_4$ |
| Sand | 3,600 | 3,600 | 3,600 | 3,600 |
| Precipitated calcium carbonate | 1,083 | 1,083 | 1,083 | 1,083 |
| Sodium nitrate | 640 | 640 | 640 | 640 |
| Soda ash | 797 | 677 | 637 | 597 |
| Potassium carbonate hydrate (85% $K_2CO_3$) | 175 | 175 | 175 | 175 |
| Sodium monoxide | None | 70 | 93.5 | 117 |
| Molar ratio, $\frac{Na_2O}{Na_2CO_3+K_2CO_3}$ | 0 | 0.145 | 0.208 | 0.277 |

The eight batches were fused in clay crucibles in the same furnace under identical conditions. The operations of fusion, refining, cooling and annealing of the eight batches were carried out under substantially identical conditions. The resulting pieces of glass from each batch were independently examined by at least four observers and each observer rated the batch examined as No. 1 (best), No. 2 (second best), No. 3 (third best) or No. 4 (poorest). These ratings were based solely upon the presence or absence of striae in the glass. From these independent ratings an average rating for each ingot was determined. For example, in the case of one ingot, 50% of the observers rated it as No. 3 and 50% rated it as No. 4; hence the rating for this ingot was calculated to be 3.5. The results of this examination and rating is tabulated below:

*Table II*

| Molar ratio, $\frac{Na_2O}{Na_2CO_3+K_2CO_3}$ | A | | B | | C (Averages) | |
|---|---|---|---|---|---|---|
| | Sample | Rating | Sample | Rating | Sample | Rating |
| 0 | $A_1$ | 3.50 | $B_1$ | 3.80 | $A_1$ and $B_1$ | 3.65 |
| 0.145 | $A_2$ | 1.75 | $B_2$ | 2.00 | $A_2$ and $B_2$ | 1.87 |
| 0.208 | $A_3$ | 1.50 | $B_3$ | 1.00 | $A_3$ and $B_3$ | 1.25 |
| 0.277 | $A_4$ | 3.25 | $B_4$ | 3.20 | $A_4$ and $B_4$ | 3.22 |

Referring to the appended drawing these experimental results were plotted as curves A and B which were explained above. The average of these ratings was then determined and plotted as curve C as shown in the appended drawing.

I claim:

1. The process for making optical glass which comprises fusing a mixture of glass making ingredients containing at least one alkali metal carbonate, and a limited quantity of sodium monoxide in such proportion that the molar ratio of sodium monoxide to total alkali metal carbonate is less than 0.3 to 1 but not less than 0.1 to 1.

2. The process for making optical glass which comprises fusing a mixture of glass making ingredients containing at least one alkali metal carbonate, and a limited quantity of sodium monoxide in such proportion that the molar ratio of sodium monoxide to total alkali metal carbonate lies within the range of 0.13:1 to 0.26:1.

3. The process for making optical glass which comprises fusing a mixture of glass making ingredients containing sodium carbonate and potassium carbonate and a limited quantity of sodium monoxide in such proportion that the molar ratio of sodium monoxide to total alkali metal carbonate is less than 0.3 to 1 but not less than 0.1 to 1.

4. The process for making optical glass which comprises fusing a mixture of glass making ingredients containing sodium carbonate and potassium carbonate, and a limited quantity of sodium monoxide in such proportion that the molar ratio of sodium monoxide to total alkali metal carbonate lies within the range of 0.13:1 to 0.26:1.

5. The process for making optical glass which comprises fusing a mixture of glass making ingredients containing sand, calcium carbonate, sodium nitrate, sodium carbonate, potassium carbonate and a limited quantity of sodium monoxide in such proportion that the molar ratio of sodium monoxide to total alkali metal carbonate lies within the range of 0.13:1 to 0.26:1.

6. The process for making optical glass which comprises fusing a mixture of glass making ingredients substantially as follows:

| | Parts by weight |
|---|---|
| Silica | 3600 |
| Calcium carbonate | 800 to 1100 |
| Sodium nitrate | 500 to 700 |
| Sodium carbonate | 630 to 680 |
| Sodium monoxide | 70 to 100 |

The molar ratio of sodium monoxide to total alkali metal carbonate in said mixture lying within the range of 0.13:1 to 0.26:1.

FRANK J. DOBROVOLNY.